United States Patent [19]

Killam

[11] 4,167,439

[45] Sep. 11, 1979

[54] NON-IONIC, WATER-SOLUBLE POLYMERS FOR IMPROVING THE DRY-STRENGTH OF PAPER

[75] Inventor: H. Scott Killam, Holland, Pa.

[73] Assignee: Rohm and Haas Company, Philadelphia, Pa.

[21] Appl. No.: 832,500

[22] Filed: Sep. 12, 1977

Related U.S. Application Data

[63] Continuation-in-part of Ser. No. 750,475, Dec. 14, 1976, abandoned.

[51] Int. Cl.$^2$ .............................................. D21H 3/38
[52] U.S. Cl. .............................. 162/163; 162/168 N; 162/168 NA
[58] Field of Search ............... 162/168 R, 163, 168 N, 162/168 NA; 526/264

[56] References Cited

U.S. PATENT DOCUMENTS

| | | | |
|---|---|---|---|
| 3,323,980 | 6/1967 | Poschmann et al. | 162/168 R |
| 3,450,680 | 6/1969 | Jursich et al. | 162/168 NA |
| 3,706,629 | 12/1972 | Moore et al. | 162/168 NA |
| 3,840,489 | 10/1974 | Strazdins | 162/168 NA |

Primary Examiner—S. Leon Bashore
Assistant Examiner—William F. Smith
Attorney, Agent, or Firm—Harold L. Greenwald

[57] ABSTRACT

A non-ionic copolymer composed of (in weight percent) 5 to 30% N-vinyl pyrrolidone, 15 to 60% acrylamide, and 30 to 70% methyl methacrylate is disclosed. The copolymer is added in minor amount to paper pulp, especially pulp containing black liquor contamination, to improve the paper making operation and the dry strength of the paper.

20 Claims, No Drawings

NON-IONIC, WATER-SOLUBLE POLYMERS FOR IMPROVING THE DRY-STRENGTH OF PAPER

CROSS REFERENCE TO RELATED APPLICATION

This application is a continuation-in-part of application Ser. No. 750,475 filed Dec. 14, 1976, now abandoned.

This invention concerns non-ionic, water-soluble copolymers comprised of essential units of N-vinyl pyrrolidone, acrylamide and methyl methacrylate, which are particularly useful as resinous additives for pulp to improve the dry strength of the paper prepared therefrom.

In recent years manufacturers of paper from unbleached Kraft and other unbleached pulps have tended to utilize "dirtier" pulps, i.e., those containing black liquor and attendant solids, dissolved sulfates, hemi-celluloses, and other contaminants. Polymeric additives for improving the dry strength of paper are normally employed in processing pulp. Such materials include natural gums and starches and synthetic organic polymers, usually composed of cationically or anionically charged particles which require a fiber deposition aid such as alum for effectiveness. However, with the so-called "dirtier" pulps, now becoming prevalent, the efficacy of the conventional dry strength resins is much reduced. One solution to the problem is disclosed by Strazdins, U.S. Pat. No. 3,840,489, who teaches the use of an aqueous dispersion of a copolymer of at least 60 weight percent of acrylamide and at least 5 percent of a hydrophobic monomer such as styrene, methyl methacrylate or acrylonitrile.

I have discovered a copolymer consisting essentially of copolymerized units (in weight percent) of 5 to 30% N-vinyl pyrrolidone, 15 to 60% acrylamide, and 30 to 70% methyl methacrylate which, in the form of a dissolved, non-ionic material in aqueous medium, gives excellent results as a dry strength improver for paper, particularly when added to black liquor contaminated pulp slurries as described above. The preferred polymers comprise linkages of about 10 to 25% N-vinyl pyrrolidone, about 15 to 35% acrylamide, and about 45 to 70% methyl methacrylate. Specific copolymers disclosed include those having 20%, 10% and 5% N-vinyl pyrrolidone, 30%, 20% and 25% acrylamide and 50%, 70% and 70% methylmethacrylate. The copolymers optionally may contain minor amounts of other polymerized hydrophobic monomers, such as butyl acrylate, ethyl methacrylate, styrene, and the like; however, the amount of these linkages should be less than 5% because their presence will decrease water solubility and effectiveness. In addition, the copolymers optionally may contain minor amounts of other polymerized hydrophilic monomers, such as N-methylol acrylamide, acrylic acid, vinyl acetate, methacrylamide, methacrylic acid, methyl acrylate and the like, the amount of the linkages not to exceed 5% in order to avoid interference with the proper deposition of the polymer on the pulp fibers and with the development of dry strength.

Although the copolymers embodied herein are described as "water-soluble," they are more explicitly provided as dispersions or colloidal dispersions in aqueous medium of finely-divided solids of such small size, i.e., ranging from 0.05 to 0.15 microns, preferably 0.05 to 0.08 microns, which dispersions essentially perform as true solutions. Accordingly, the copolymers are prepared by conventional emulsion polymerization techniques whereby the monomers in appropriate proportions are polymerized in an agitated aqueous medium containing a small amount of dispersing agent, such as sodium alkyl aryl sulfonate, a sodium alkyl napthalene sulfonate, sodium alkyl sulfate and the like, the reaction being catalyzed by a free-radical initiator, for example, sodium persulfate, tert-butyl peroxide, benzoyl peroxide, azobisisobutyronitrile, ammonium persulfate, and others. Normally, about 0.1 to about 1% of initiator, based on monomer weight, is used and the temperature of polymerization will range from about 20° to 80° C. or 90° C. The reaction will generally be substantially complete after 1 to 4 hours. The amount of water in the reaction medium is usually adjusted so that the copolymer product is recovered in aqueous dispersion containing from about 10 to about 20% polymer solids by weight, although other solids contents can be used. As an indication of the molecular weights of the copolymers embodied herein, the viscosities of aqueous mixtures thereof containing 10% by weight of polymer solids are in the range of about 10 to about 500 centipoise (cps.) at 25° C., at a pH of about 4 to 8. Viscosity does not vary appreciably with changes in pH. Although the copolymer may be recovered as dried solids by separation from the aqueous carrier by conventional means, it is more convenient to retain the product in admixture with water for shipment and ultimate utilization, after dilution, in paper pulp processing.

Thus, in accordance with the present invention, I have discovered that the hereindescribed copolymer provides marked improvements in the dry strength properties of paper when added to the pulp from which the paper is made, especially when said pulp contains significant amounts of black liquor and related contaminants. Good results are obtained using on the order of about 0.15 to about 0.5% of the copolymer based on the weight of dry paper fiber in the pulp. The copolymer is usually added to the pulp as a dilute dispersion (ca. 1 to 5%) in water at any convenient point such as between the fan pump and the head box.

The incorporation of the copolymer in the pulp has other advantages in addition to increasing dry strength; in the paper formation operation, it can promote increased drainage rates and fines retention, and a decrease in white water solids. The copolymer does not improve the paper's wet strength, meaning that broke recovery or ability to repulp trim and waste is not impeded.

The following illustrative examples demonstrate typical preparations of the copolymer of the invention and the results of its use in pulp treatment.

EXAMPLE 1

To a reaction vessel fitted with stirring and heating means are charged 850 ml. water, 3.1 g sodium dodecylbenzenesulfonate and 12.5 g. N-vinylpyrrolidone. Then to this are added as separate streams over a period of about 1.5 hours an emulsion composed of 130 ml. water, 1.5 g. of the foregoing sulfonate and 179 g. methyl methacrylate, and a solution consisting of 12.5 g. N-vinylpyrrolidone and 50 g. acrylamide in 200 ml. water. The reaction is catalyzed by the addition of 0.8 g. of azoisobutyronitrile to the reaction kettle just prior to beginning monomer addition. The polymerization is carried out at about 90° C. during the addition, and the emulsion is held at 75°–80° C. for two hours thereafter.

The cooled product, a pale grey dispersion containing 18% copolymer solids, has a viscosity of about 500 cps. The copolymer is composed of polymerized units, by weight, of 70.5 methyl methacrylate, 19.7 acrylamide, and 9.8 N-vinyl pyrrolidone.

EXAMPLE 2

A mixture of 700 ml. water, 70 g. methyl methacrylate, 25 g. acrylamide, 5 g. N-vinyl pyrrolidone and 1 g. sodium dodecylbenzene sulfonate is heated to 71° C. with stirring, whereupon a solution of 0.4 g. sodium persulfate in 10 ml. water is added causing the reaction temperature to climb to 77° C. in ten minutes. A temperature of 77°-80° C. is maintained by heating for two hours. The cooled, grey hazy product, viscosity of 21 cps., contains 12.3% dispersed solids, a copolymer of polymerized units of 70% methyl methacrylate, 25% acrylamide, and 5% vinyl pyrrolidone.

EXAMPLE 3

The procedure of the previous examples is repeated except that the sodium persulfate is replaced by 0.4 g. azoisobutyronitrile. The viscosity of the product dispersion (11.5% copolymer solids) is 385 cps.

EXAMPLE 4

To a mixture of 700 ml. water, 8 g. of a 23% solution of sodium dodecylbenzene sulfonate, 30 g. acrylamide, 50 g. methyl methacrylate and 20 g. N-vinylpyrrolidone, stirred at 20°-22° C. and blanketed by an inert stream of nitrogen, is added 0.1 ml. of tert-butylhydroperoxide, then 0.1 g. sodium formaldehyde sulfoxylate in 10 ml. water. One ml. of a 0.15% solution of ferrous sulfate is added to prevent coagulation of the polymer which begins to form as the temperature of reaction rises, to about 33° C. in ten minutes. A temperature of 25°-35° C. is maintained for 3 hours. The product has a viscosity of 70 cps. and dispersed solids content of 12.4% consisting of the copolymer: 50% methyl methacrylate, 30% acrylamide and 20% vinyl pyrrolidone. This resin dispersion is evaluated as an additive for improving the dry strength of Kraft paper prepared from pulp slurry in which variations in sulfate black liquor content, alum content, resin addition, pH and water temperature are simulated under plant conditions. The effectiveness of the resin is gauged by measuring the Mullen burst strength (in lbs./sq. in.) of the paper, an indication of its dry strength.

TEST SERIES I

The pulp is beaten to 650 Canadian Standard Freeness (CSF) and pH is controlled at 6. The black liquor is added as a 50% solids solution and is in addition to that already present in the pulp. Water used is at room temperature. As is conventional the amounts of additives are based on the oven dry weight of paper fibers in the pulp (e.g., 1 g. polymer and 100 g. pulp gives 1% polymer and 2% of the 50% black liquor solution, and 100 g. pulp gives 1% black liquor solids on dry fibers). Thus in this and the following test series % blank liquor means % black liquor solids by weight on the fibers. The polymer of Example 4 was used in this and in each of the following test series. The data are summarized as follows:

| Sheet No. | Liquor | % Black Liquor | % Alum | Solids | % Polymer Value | Mullen Value |
|---|---|---|---|---|---|---|
| 1. | Basis weight = 62 g./m² (32 lb./3000 ft.²) | | 0 | 1 | 0 | 31.9 |
| 2. | | | 0 | 1 | 0.25 | 34.3 |
| 3. | | | 2 | 1 | 0 | 32.6 |
| 4. | | | 2 | 1 | 0.25 | 36.3 |
| 5. | Basis weight = 98 g./m² (60 lbs./3000 ft.²) | | 0 | 1 | 0 | 52.4 |
| 6. | | | 0 | 1 | 0.25 | 62.0 |
| 7. | | | 2 | 1 | 0 | 53.5 |
| 8. | | | 2 | 1 | 0.25 | 62.4 |
| 9. | Basis weight = 98 g./m² | | 0 | 2 | 0 | 42.5 |
| 10. | | | 0 | 2 | 0.25 | 47.9 |
| 11. | | | 2 | 2 | 0 | 43.4 |
| 12. | | | 2 | 2 | 0.25 | 48.6 |
| 13. | | | 4 | 2 | 0 | 43.6 |
| 14. | | | 4 | 2 | 0.25 | 51.3 |
| 15. | | | 6 | 2 | 0 | 42.9 |
| 16. | | | 6 | 2 | 0.25 | 51.7 |

TEST SERIES II

Conditions are the same as in the previous series; the level of polymer addition is more varied, other additives kept constant.

| Sheet No. (Basis wt. 98 gm./m²) | % Black Liquor | % Alum | % Polymer Solids | Mullen Value |
|---|---|---|---|---|
| 1 | 2 | 2 | 0 | 42.5 |
| 2 | 2 | 2 | 0.15 | 46.8 |
| 3 | 2 | 2 | 0.25 | 48.8 |
| 4 | 2 | 2 | 0.35 | 49.3 |
| 5 | 2 | 2 | 0.50 | 51.7 |

The above results confirm that the compositions of the invention can provide increases in Mullen values of 20% or more at practical usage levels ranging from 3 lbs. to 10 lbs. of resin per ton of fiber.

TEST SERIES III

Conditions are the same as in the previous series; the level of polymer addition is 0.25% on dry fiber weight. The results demonstrate the superiority of the present composition over other commercially available resins.

| Polymer | Mullen Values No Black Liquor | 2% Black Liquor |
|---|---|---|
| None | 54.2 | 54.3 |
| Anionic Resin A[1] | 63.0 | 54.5 |
| Cationic Resin U[2] | 63.8 | 51.8 |

| | Mullen Values | |
|---|---|---|
| Polymer | No Black Liquor | 2% Black Liquor |
| Resin of Invention | 59.5 | 58.8 |

[1]Anionic resin A is a solution copolymer composition of which is approximately 95% acrylamide, 5% acrylic acid.
[2]Cationic resin U is a copolymer of acrylamide (about 85%–90%) and styrene (10%–15%) with a small portion of the amide groups converted to amine groups.

TEST SERIES IV

Conditions are the same as in Series II except that the working pulp stock, 2% consistency, is diluted with hot water (54.5° C.) through several treatment stages to the final hand sheet formation consistency of about 0.13%. The level of resin addition is 0.25%. Resin "A" is the anionic resin described in the previous series. Resin "B" is the resin of Example 4 of this invention. (The large differences in Mullen values between the samples containing 1% and 2% alum are due to the use of different batches of pulp in the respective tests).

| Mullen Values | | | | |
|---|---|---|---|---|
| No Black Liquor | | 2% Black Liquor | | |
| No Resin | 0.25% Resin | No Resin | 0.25% Resin | Alum |
| 71.5 | (B) 77.5 | 68.5 | (B) 75.3 | 1% |
| 46.7 | (B) 53.0 | 47.7 | (B) 56.6 | 2% |
| 46.7 | (A) 55.0 | 47.7 | (A) 49.0 | 2% |

TEST SERIES V

Conditions are the same as in Series II except that the pH of the pulp is varied by the addition of dilute sulfuric acid thereto.

| % Black Liquor | pH | Mullen Values | |
|---|---|---|---|
| | | No Resin | 0.25% Resin of Example 4 |
| 0 | 4 | 53.6 | 58.1 |
| 0 | 5 | 54.0 | 61.5 |
| 0 | 6 | 54.1 | 59.7 |
| 2 | 4 | 52.2 | 56.5 |
| 2 | 5 | 53.9 | 56.2 |
| 2 | 6 | 52.7 | 58.7 |

TEST SERIES VI

In these tests the effectiveness of the new dry strength resin is evaluated in conjunction with the employment of white water recycle operations wherein the fines and soluble constituents are reused to make subsequent hand sheets. The amount of black liquor added back to the pulp in each cycle is 2%, and the sheet has a basis weight of 62 g./m².

| Cycle | % Alum | No Resin | 0.25% Resin of Example 4 |
|---|---|---|---|
| 1 | 1 | 16.4 | 20.7 |
| 2 | 1 | 18.3 | 21.1 |
| 3 | 1 | 19.2 | 22.6 |
| 4 | 2 | 21.6 | 23.8 |
| 5 | 2 | 22.6 | 24.8 |
| 6 | 2 | 22.1 | 24.9 |

Results comparable to those obtained in the foregoing tests are obtained when the other polymers produced according to the above examples are substituted for the particular terpolymer composition described.

It will be noted from the foregoing examples that these examples involve the addition of up to 6% of black liquor by weight of the fiber, the minimum amount (except in the comparative examples showing none) being 2% of black liquor.

I claim:

1. A method of increasing the dry strength of paper which comprises incorporating in the pulp from which the paper is derived from about 0.15% to about 0.5% based on the dry paper fiber weight of a water-soluble non-ionic copolymer consisting essentially of polymerized units, in weight percent, of 5 to 30% N-vinyl pyrrolidone, 15 to 35% acrylamide, and 30 to 70% methyl methacrylate said copolymer having a viscosity of about 10 to about 500 centipoise at 10% by weight in water at 25° C., at a pH of about 4 to 8.

2. The method of claim 1 wherein the N-vinyl pyrrolidone is about 10 to 25%, and the methyl methacrylate is about 45 to 70%.

3. The method of claim 1 in which the pulp is unbleached Kraft pulp.

4. The method of claim 3 in which black liquor solids are present in an amount of up to 6% by weight of the fibers.

5. The method of claim 4 in which about 2% to 6% black liquor solids are present and 0 to about 2% alum.

6. The method according to claim 1 wherein the N-vinyl pyrrolidone is about 20%, the acrylamide is about 30% and the methyl methacrylate is about 50%.

7. The method of claim 6 wherein the incorporation is by means of an aqueous mixture containing from about 10 to about 20 weight percent of the copolymer as dispersed solids.

8. The method according to claim 1 wherein the N-vinyl pyrrolidone is about 10%, the acrylamide is about 20% and the methyl methacrylate is about 70%.

9. The method according to claim 1 wherein the N-vinyl pyrrolidone is about 5%, the acrylamide is about 25% and the methyl methacrylate is about 70%.

10. The method of claim 1 wherein the incorporation is by means of an aqueous mixture containing from about 10 to about 20 weight percent of the copolymer as dispersed solids.

11. The method of claim 1 wherein the copolymer contains up to 5% of one or more other polymerized hydrophobic monomers.

12. The method of claim 11 in which said hydrophobic monomers are one or more of butyl acrylate, ethyl methacrylate or styrene.

13. The method of claim 1 wherein the copolymer contains up to 5% of one or more polymerized hydrophilic monomers in addition to acrylamide and N-vinylpyrrolidone.

14. The method of claim 13 in which said additional hydrophilic monomers are one or more of N-methylolacrylamide, acrylic acid, vinyl acetate, methacrylamide, methacrylic acid or methyl acrylate.

15. The method of claim 2 wherein the incorporation is by means of an aqueous mixture containing from about 10 to about 20 weight percent of the copolymer as dispersed solids.

16. Paper made by the method of claim 1.
17. Paper made by the method of claim 2.
18. Paper made by the method of claim 6.
19. Paper made by the method of claim 8.
20. Paper made by the method of claim 9.

* * * * *